United States Patent [19]

Streater et al.

[11] 3,712,395
[45] Jan. 23, 1973

[54] WEIGHT SENSING CELL

[75] Inventors: August L. Streater; John A. Whitney, both of Bluffton, Ind. 46714

[73] Assignee: Franklin Electric Co., Inc., Bluffton, Ind.

[22] Filed: Nov. 16, 1970

[21] Appl. No.: 89,736

[52] U.S. Cl. .................. 177/210, 177/1, 177/255, 73/DIG. 1, 73/67.2
[51] Int. Cl. .............................................. G01g 3/16
[58] Field of Search ......... 84/455, 199, 297 R, 297 S, 84/402–405, 454, 458; 181/33 R, 33 D; 177/1, 210, 211, 255; 73/DIG. 1, 67 R, 67.2

[56] References Cited

UNITED STATES PATENTS

| | | | |
|---|---|---|---|
| 1,543,124 | 6/1925 | Ricker | 73/67.2 |
| 2,604,787 | 7/1952 | Coyne et al. | 73/DIG. 1 |
| 2,625,659 | 1/1953 | Mendelson | 73/67.4 |
| 2,694,310 | 11/1954 | Pounds | 177/1 |
| 2,782,633 | 2/1957 | Stauss et al. | 73/67.2 |
| 2,802,660 | 8/1957 | Williams | 177/211 |
| 2,817,550 | 12/1957 | Jones | 177/255 |
| 2,963,222 | 12/1960 | Allen | 177/DIG. 1 |
| 3,011,572 | 12/1961 | Bellier | 177/210 |
| 3,080,936 | 3/1963 | Sher et al. | 177/210 |
| 3,322,222 | 5/1967 | Baur | 177/210 |
| 3,371,731 | 3/1968 | Connors et al. | 177/188 |
| 3,423,999 | 1/1969 | Wirth et al. | 177/210 |
| 3,492,858 | 2/1970 | Heflinger et al. | 177/1 |
| 3,555,886 | 1/1971 | Thornton | 177/210 |
| 3,565,193 | 2/1971 | Wirth | 177/1 |
| 3,595,329 | 7/1971 | Withnell et al. | 177/1 |

FOREIGN PATENTS OR APPLICATIONS

| | | | |
|---|---|---|---|
| 260,730 | 9/1964 | Australia | 177/210 |
| 685,598 | 5/1964 | Canada | 177/210 |
| 622,581 | 12/1935 | Germany | 177/210 |
| 397,167 | 8/1933 | Great Britain | 73/67.4 |
| 823,847 | 11/1959 | Great Britain | 73/DIG. 1 |
| 899,208 | 6/1962 | Great Britain | 73/67 |
| 1,143,112 | 2/1969 | Great Britain | 177/210 |
| 1,155,412 | 6/1969 | Great Britain | 177/210 |
| 183,976 | 11/1966 | U.S.S.R. | 73/67 |

*Primary Examiner*—Robert S. Ward, Jr.
*Attorney*—Hibben, Noyes & Bicknell

[57] ABSTRACT

This disclosure deals with a weight sensing cell for a scale, including two differentially loaded vibrating members. The two members are pretensioned, and they are arranged and connected to a weighting platform of the scale such that, by the differential loading, a weight on the platform increases the tension on one member and decreases the tension on the other member, the amount of tension on each member determining its frequency of vibration. Means is provided to generate two signals which are respectively representative of the frequencies of vibration of the two members, and the frequency of one of these members or a combination of the frequencies of the two members is taken as an indication of the amount of weight on the platform. Means is also provided to adjust the amount of pretension on the members and to compensate for any non-linear characteristic, and thereby achieve an essentially linear relationship between frequency and weight.

27 Claims, 15 Drawing Figures

PATENTED JAN 23 1973

Inventors:-
August L. Streater,
John A. Whitney,
By Hibben, Noyes & Bicknell
Attys.

WEIGHT SENSING CELL

The weight sensing cells of nearly all commercial scales utilize as an indication of weight either the amount of deflection of a precision spring or the movement of a balanced beam. While such cells are entirely adequate for many purposes, they have disadvantages when used in a computing scale which is required to make a large number of rapid and accurate weight determinations. For example, present computing scales require analog-to-digital conversion circuits, can handle only relatively small weights, are very expensive, and require periodic maintenance in order to preserve accuracy.

In accordance with the present invention, a weight sensing cell for a scale is provided, the cell including weight receiving means adapted to have a weight representative force applied thereto, a stationary support, first and second vibrating members, first means connecting one end of said first member to one end of said second member, second means connecting the other end of said first member to said support, third means connecting the other end of said second member to said support, adjustable means for pretensioning said first and second members, means connecting said weight receiving means to said first means such that the weight of an article decreases the tension on said first member and increases the tension on said second member, thus differentially loading said members, the frequencies of vibration of said first and second members being representative of the tensions on said members, means for vibrating said first and second members and for providing signals which are representative of the frequencies of vibration of said first and second members, and means for actuating said adjustable means to adjust said pretension of said first and second members. The actuating means responds to the frequencies of vibration of the first and second members, obtains the difference between the frequencies of one of the members and a fixed frequency, and actuates the adjustable means to maintain a predetermined relation between said difference frequency and the frequency of the other of the members. In addition, means may be provided to correct any non-linearity and thereby produce an essentially linear relationship between weight and the frequencies of said members. By using two differentially loaded members, maintaining the above-mentioned predetermined relation between the frequencies, controlling the amplitude of vibration of the two members, and correcting for any non-linearity, a weight sensing cell is provided which is exceptionally accurate and is suitable for use in such difficult locations as supermarkets.

Other objects and advantages of the invention will become apparent from the following detailed description taken in conjunction with the accompanying figures of the drawings, wherein.

While the weight sensing cell of the scale shown in FIGS. 1 to 13 is described and illustrated in connection with a relatively small computing scale of the type used, for example, in weighing packages of food or relatively small articles, it should be understood that the cell is equally adaptable for use in both larger and smaller scales designed to weigh any type of article or articles.

Figure 1:
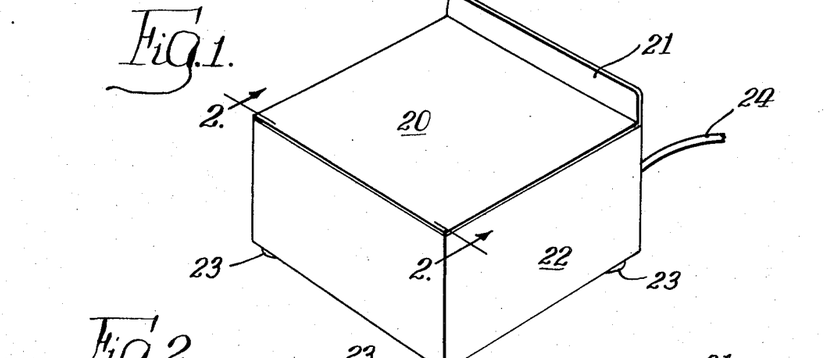
FIG. 1 shows a scale including a weight sensing cell embodying the invention.
Figure 2:
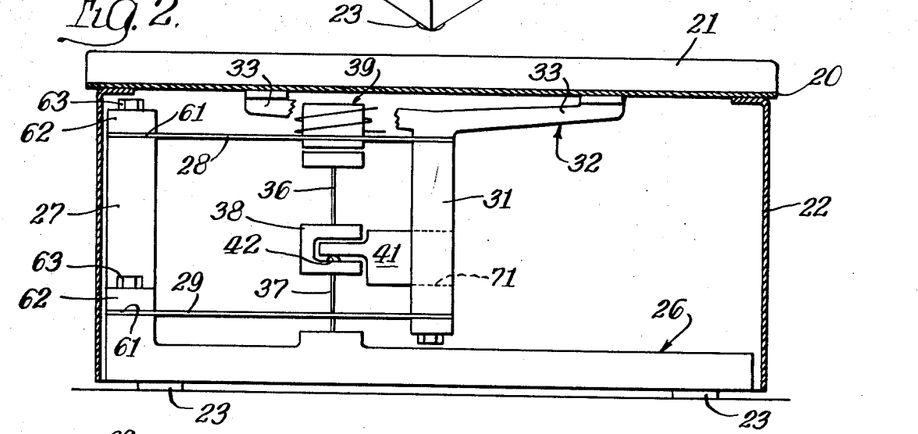
FIG. 2 is a schematic illustration of a weight sensing cell, taken on the line 2—2 of FIG. 1.

With reference to FIGS. 1 and 2, the scale comprises a pan 20 on which an article to be weighed is placed, the pan 20 having a stop 21 at the rear edge thereof to prevent packages from falling off the pan 20. Attached to the pan 20 is a skirt 22 which extends downwardly from the edges of the pan and encloses the cell of the scale, the skirt 22 being secured to the edges of the pan 20 as by spot welding. A cable 24 (FIG. 1) extends from the cell through an opening in the skirt 22 to a computer (not shown) designed to receive weight representative signals from the cell.

Figure 3:
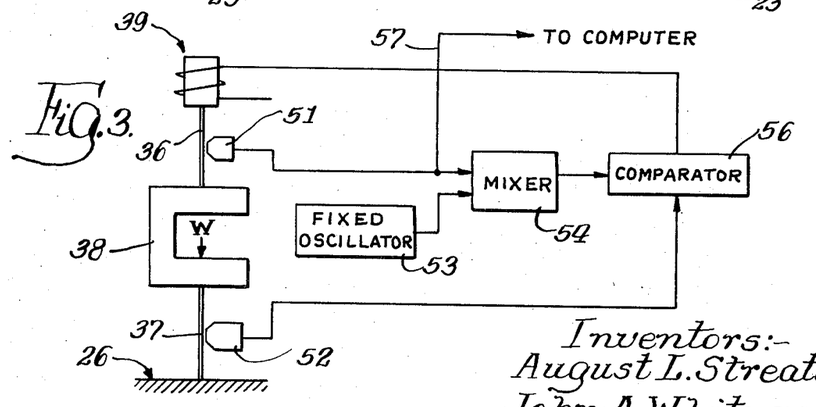
FIG. 3 is a simplified diagram of the cell.

With reference to FIGS. 2 and 3, the scale further comprises a frame or base 26 which is supported by a plurality of feet 23 preferably made of a resilient material such as rubber. The base 26 is preferably made of a relatively heavy rigid member such as cast iron. In the present construction, the base 26 extends across the bottom of the scale and includes an upstanding or vertical portion 27 at one edge thereof. Upper and lower flexure links 28 and 29 are rigidly secured at their outer ends to the vertical portion 27 of the base 26 and extend substantially horizontally toward the center of the scale. The inner end of each flexure link is rigidly secured to a loading bar brace 31. In the present instance, two upper links 28 and two lower links 29 are provided, the four links being parallel with each other. As shown in FIG. 2, the brace 31 extends substantially vertically and has the links 28 and 29 secured to its upper and lower edges respectively. Also secured to the upper edge of the loading bar brace 31 is a pan bracket 32 which connects the loading bar brace 31 to the underside of the pan 20. The loading bar brace 31 and its connection to the pan bracket 32 are located at approximately the center of the scale, and, as will be described in more detail hereinafter, the pan bracket 32 includes a plurality, in the present instance four, of diagonal horizontally extending arms 33 which have their outer ends connected to the underside of the pan 20, so that a force exerted downwardly on the pan 20 is transferred through the pan bracket 32 to the loading bar brace 31. The flexure links 28 and 29 form substantially a parallelogram and hold the brace 31 in a vertical plane as it shifts upwardly or downwardly.

While the drawings show a construction where the base 26 is positioned relative to the pan 20 and the skirt 22 such that the vertical portion 27 is adjacent a side edge of the pan 20, the base 26 could equally well be positioned relative to the pan 20 and the skirt 22 such that the vertical portion 27 is adjacent the stop 21 at the rear edge of the pan 20.

The load cell of the scale further includes upper and lower vibrating members 36 and 37, respectively, which are positioned in the present instance in end-to-end vertical alignment. While the members 36 and 37 may be strings, wires, bands, ribbons, etc., they are referred to herein by the general term of strings. The lower end of the lower string 37 is rigidly secured to the base 26, the upper end of the lower string 37 is rigidly secured to a loading element in the form of a cylinder 38 (FIGS. 2 and 3), the lower end of the upper string 36, is also secured to the loading cylinder 38, and the upper end of the upper string 36 is secured to a tension adjusting device which, in the present instance, comprises a servo 39. Means including the servo 39 and springs to be described hereinafter hold the two strings 36 and 37 under a pretension in the absence of a weight on the pan 20. The loading bar brace 31 is connected to the loading cylinder 38 by means of a loading bar 41 which has its right hand end, as seen in FIG. 2, rigidly secured to the brace 31 and its left hand end resting on a pin 42 which in turn is supported by the cylinder 38.

From the foregoing it will be apparent that a load placed on the pan 20 will tend to move the pan bracket 32 and the brace 31 downwardly, such movement being resisted by the resiliency of the links 28 and 29 and the tension of the upper string 36. Consequently, a weight on the pan 20 will cause the tension on the upper string 36 to increase and the tension on the lower string 37 to decrease, the amount of change in tension on each string being proportional to the weight on the pan 20.

As will be discussed in greater detail hereinafter, it is well known that the natural or fundamental frequency of vibration of a string or wire under tension is a function of the amount of tension in the string. The approximate equation for this relation is $$f = (1/2L) \sqrt{T/\rho} \qquad (1)$$

wherein $T$ is the amount of tension in pounds in the string, $\rho$ is the mass per unit length of the string, $L$ is the length of the string, and $f$ is the frequency in Hz.

From the foregoing equation (1), it will be apparent that an increase in the value of T, due to a weight on the pan 20, will increase the fundamental frequency of vibration of the string 36, whereas such a weight on the pan 20 will decrease the tension in the lower string 37 and decrease its fundamental frequency of vibration.

It can also be shown by a mathematical analysis to be discussed hereinafter that the fundamental frequency of vibration of both the upper string 36 and the lower string 37 can be made to vary essentially linearly with variations in the amount of weight on the pan 20 by adjusting the pretensions in the strings to maintain a predetermined relation between the frequencies of the strings 36 and 37.

The servo 39 is provided to vary the amount of pretension on the two strings 36 and 37 both with or without a weight on the pan 20. The servo 39 is actuated by a control circuit which, like the other circuits disclosed herein, may be either electrical or fluidic. In the present instance, electrical circuits are illustrated. With reference to FIG. 3, which is a simplified schematic diagram of a circuit of the cell, a pair of identical pick-ups 51 and 52 are positioned adjacent the two strings 36 and 37, respectively, each pick-up 51 and 52 providing a signal having a frequency which is representative of the frequency of vibration of the associated string. The signals provided by the pick-ups 51 and 52 are fed to a circuit including a fixed frequency oscillator 53, a mixer 54, and a frequency comparator 56. As will be described in more detail hereinafter in connection with FIG. 10, the frequency of the oscillator 53 and the frequency of the signal provided by the pick-up 51 are combined in the mixer 54 to provide a difference signal which is compared in the comparator 56 with the frequency of the signal induced in the pick-up 52 by the lower wire 37. The comparator 56 generates an error signal when the input frequencies received thereby deviate from a predetermined relation, and the error signal is connected to actuate the servo 39. The error signal actuates the servo to adjust the pretension on the two wires 36 and 37 in such a manner as to maintain the error signal at a fixed value such as zero. As previously mentioned, by adjusting the tension the frequency of vibration of each of the strings 36 and 37 is made to vary essentially linearly with changes in weight on the pan, and, in the present instance, the linearly varying frequency of the upper string is taken from the upper pick-up 51 and connected by a conductor 57 to a computer (not shown), the conductor 57 being located in the cable 24. The computer may be of any type which measures frequency and is calibrated to provide a weight indication based on a frequency measurement. While in the construction illustrated the frequency of the upper string 36 is taken as an indication of weight, the frequency of the lower string 37, or a combination of the frequencies of the two strings 36 and 37, could be taken as an indication of weight.

Figure 4:
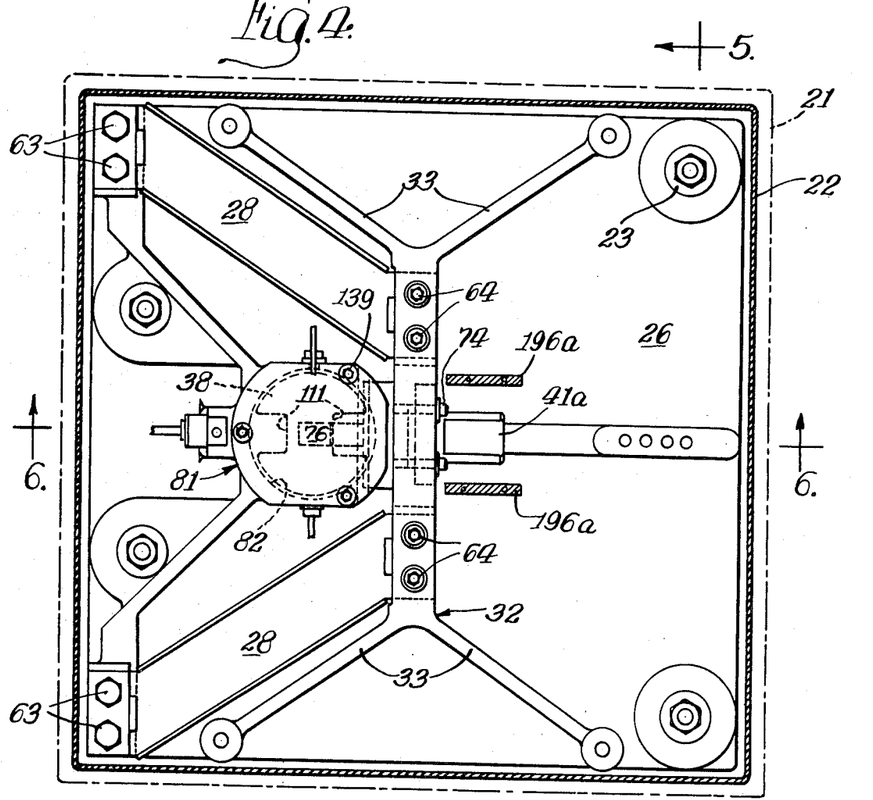
FIG. 4 is a sectional view showing in greater detail the cell of the scale.

The mechanical features of the weight sensing cell are shown in greater detail in FIGS. 4 through 9. With reference to FIG. 4, the four diagonally extending arms 33 of the pan bracket 32 are clearly shown. The underside of the pan 20 is connected to the outer ends of the arms 33, these outer ends being spaced a considerable distance from each other in order to provide a stable support for the pan 20.

As previously mentioned, the outer ends of the two upper flexure links 28 are connected to the upper end of the vertical portion 27 of the base 26 and the outer ends of the two lower flexure links 29 are connected to the vertical portion 27 below the links 28. The outer end of each link 28 and 29 is positioned on a flat surface 61 of the vertical portion 27, the four surfaces 61 being machined parallel with each other. The outer end of a flexure link is secured to each surface 61 by a clamp block 62 (FIG. 6) and a pair of screws 63.

Figure 5:
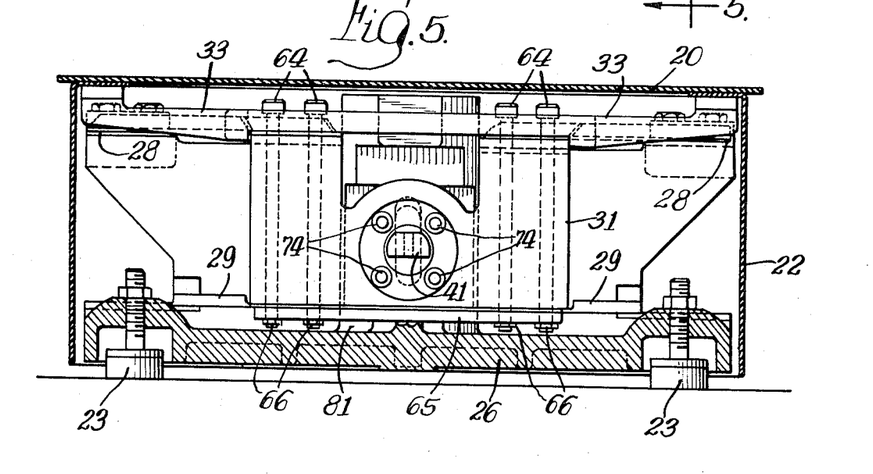
FIG. 5 is a sectional view taken on the line 5—5 of FIG. 4.
Figure 6:
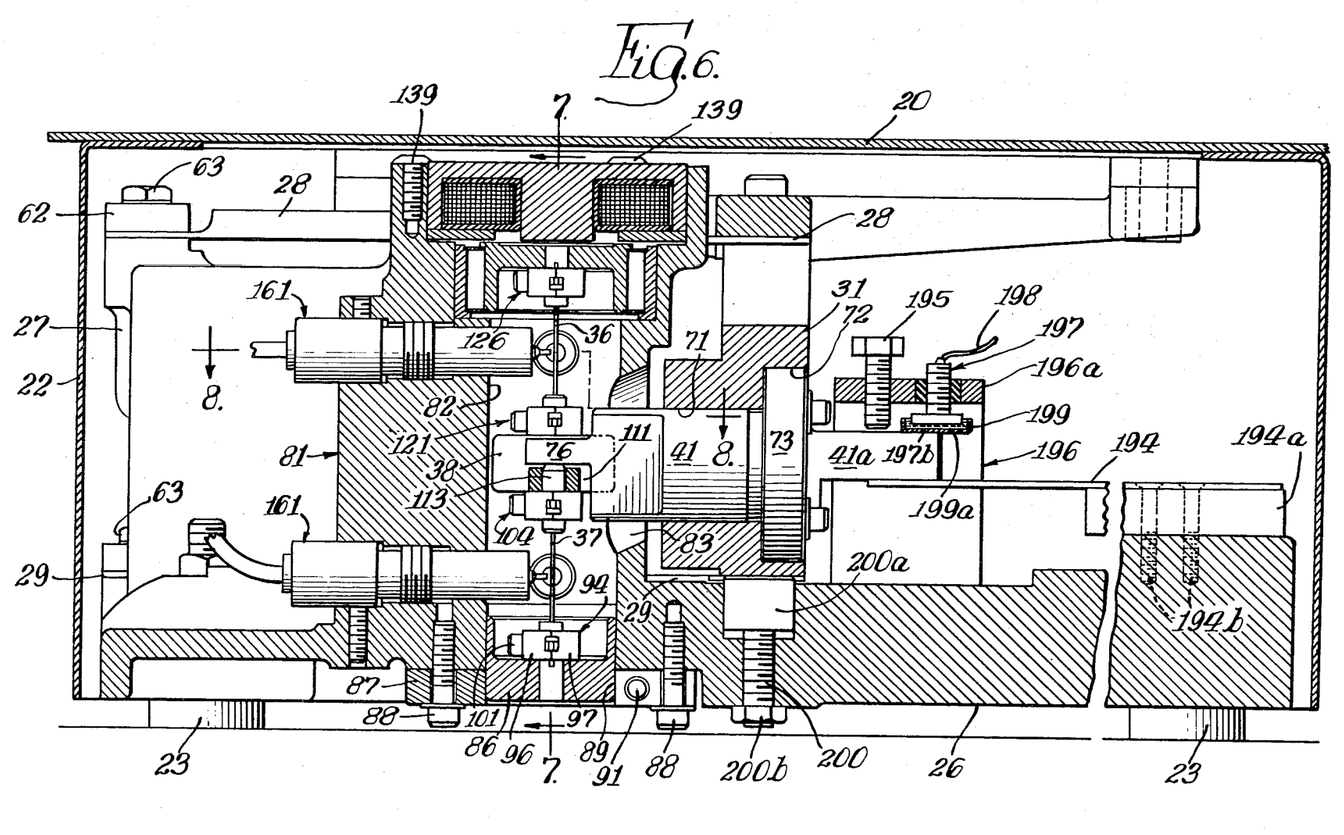
FIG. 6 is a sectional view taken on the line 6—6 of FIG. 4.

The inner end of each flexure link 28 is secured between the pan bracket 32 and the loading bar brace 31, and the inner end of each flexure link 29 is secured to the underside of the loading bar brace 31. Four vertically extending bolts 64 are positioned in holes formed through the pan bracket 32, through the inner ends of the links 28, through the brace 31, and through the inner ends of the lower links 29, and nuts 66 on the lower ends of the bolts 64 hold these parts in rigidly assembled relation. A clamping plate or bar 65 (FIG. 5) is preferably positioned between the nuts 66 and the inner ends of the lower links 29. The upper and lower surfaces of the brace 31, where the brace 31 is connected to the links 28 and 29, are also preferably machined parallel to each other. As shown in FIGS. 4, 5 and 6, the portion of each link 28 and 29 between the vertical portion 27 and the brace 31 is, in the present instance, bent at its edges to form a channel.

To transfer a force from the pan 20 to the strings 36 and 37, the loading bar brace 31 has a circular hole 71 (FIGS. 4 to 6) formed therethrough, the hole 71 being counterbored as indicated at 72 on its side which is away from the links 28 and 29. The loading bar 41 is generally cylindrical and extends through the hole 71, and has a flange 73 which is received within the counterbore 72. Four holes extend through the flange 73 and into the loading bar brace 31 where they are tapped to receive four screws 74 in order to rigidly secure the loading bar 41 to the loading bar brace 31. At its left end, as seen in FIGS. 4 and 6, the loading bar 41 includes a finger 76 which transfers a downward force on the brace 31 to the loading cylinder 38 and the strings 36 and 37.

To support and pretension the two vibrating strings 36 and 37, the base 26 includes a vertically extending hollow post 81 (FIGS. 6 and 8) which has a hole 82 formed therethrough. The wall of the post 81, on the side which is adjacent the loading bar brace 31, has an opening 83 formed therethrough, and the loading bar 41 extends through opening 83 and into the hole 82. At the lower end of the hole 82 is positioned a base cylinder 86 (FIGS. 6 and 7) which is rigidly secured in a split clamp ring 87 and the latter is secured to the underside of the base 26 by a plurality of bolts 88. A bolt 91 bridges the split in the ring 87 and clamps the ring 87 to the cylinder 86 when it is tightened.

The lower end of the lower string 37 is secured to the base cylinder 86, which in turn anchors this string 37 on the base 26, by a clamp assembly 94 (FIGS. 6 and 7), the clamp assembly 94 including a pair of channel-shaped jaws 96 and 97. The jaws 96 and 97 are positioned with their flanges 98 and 99 extending horizontally toward each other, and the vertically extending string 37 extends between the flanges 98 and 99 of the two jaws. The string 37 is clamped between the jaws 96 and 97 by a pair of bolts 101 extending through one of the jaws and threaded into the other, the bolts being located on opposite sides of the string 37. As will be explained hereinafter, the string 37 is preferably, but not necessarily, a flat band or ribbon, and the width of such a string 37 is placed flat against the faces of the flanges 98 and 99. The upper flange 98 of each of the jaws 96 and 97 is thinner then the bottom flange 99, and the relatively thin flanges 98 serve to clamp the string 37 between them. Thus, the thin flanges 98 accurately define the lower end of the vibrating portion of the string 37.

The clamp assembly 94 is secured to the base cylinder 86 by a pair of bolts 102 (FIG. 7) which are positioned in holes formed in the jaws 96 and 97 and are threaded into tapped holes formed in the base cylinder 86. The base cylinder 86 preferably has a center opening 103 formed therethrough on the axis of the string 37, into which the lower end of the string 37 may extend.

The upper end of the lower string 37 is rigidly secured by another clamp assembly 104 to the loading cylinder 38, the clamp assembly 104 preferably being identical with the clamp assembly 94. Thus, the clamp assembly 104 includes a pair of jaws having a channel shape with one flange of each jaw thinner than the other. The relatively thin flange of each jaw is on the lower side of the clamp assembly 104. The upper end of the string 37 extends between the flanges of the clamp assembly 104 and is rigidly secured between them in a manner identical with that of the clamp assembly 94. Thus, the thin flanges of the clamp assembly 104 together with the thin flanges of the jaws 96 and 97 define the vibrating portion of the string 37. A pair of bolts 106 positioned in holes formed in the jaws are employed to secure the clamp assembly 104 to the underside of the loading cylinder 38.

Figure 7:
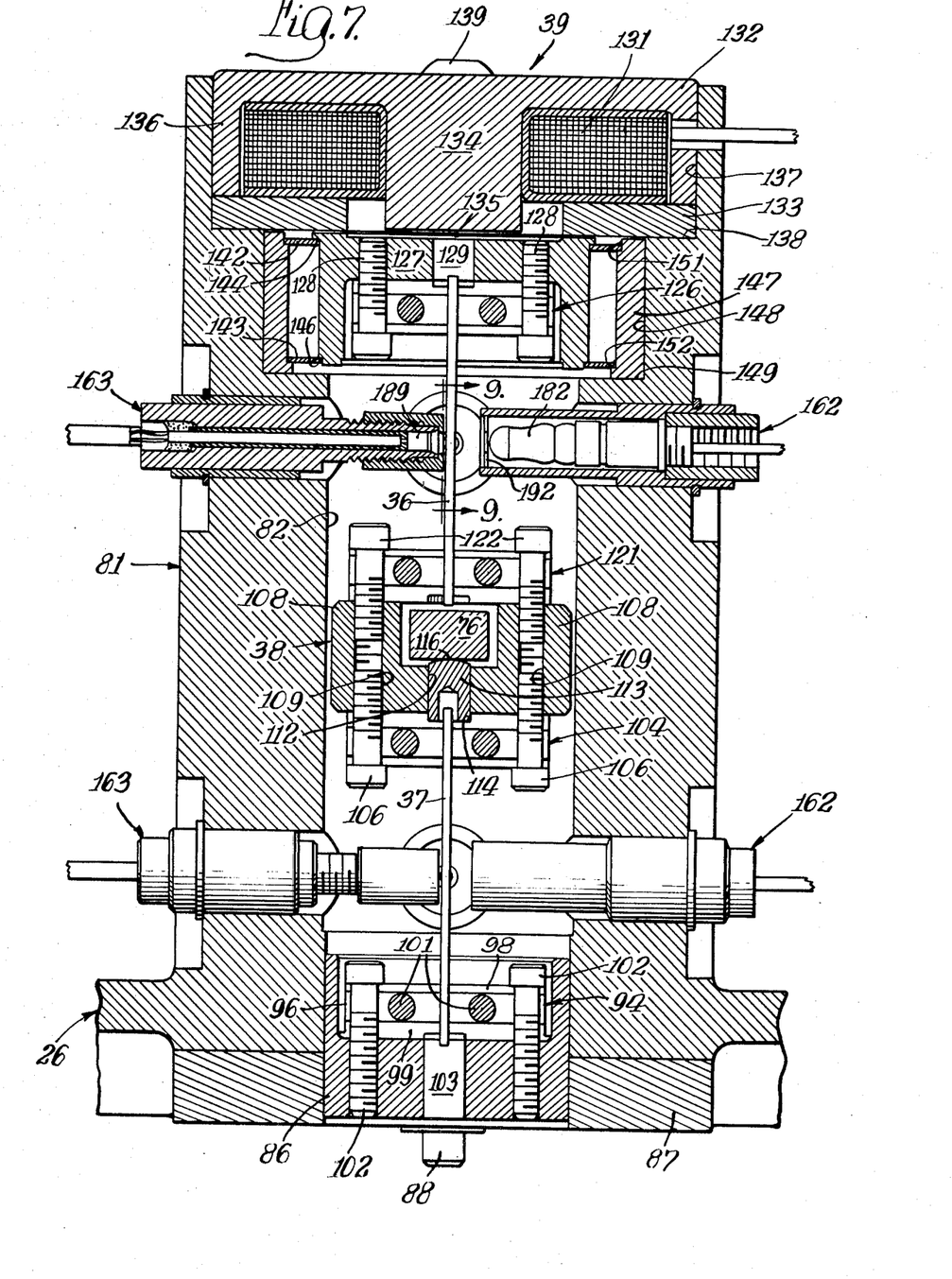
FIG. 7 is a sectional view taken on the line 7—7 of FIG. 6.

As is best shown in FIG. 7, the loading cylinder 38 is generally U-shaped in vertical section, and it has a generally circular configuration when viewed from the top. Vertical tapped holes 109 extend through the two arms 108 of the loading cylinder 38, and the bolts 106 are threaded into the lower ends of the holes in order to secure the clamp assembly 104 to the loading cylinder 38. The loading cylinder is slotted as at 111 on opposite sides thereof, and one of the two slots 111 is positioned to receive the inner end of the loading bar 41 as shown in FIGS. 4 and 6. The central or web portion of the loading cylinder 38 also has a vertically extending hole 112 formed through the center thereof, and a loading pin 113 is positioned within the hole 112. The lower end of the loading pin 113 is supported on the clamp assembly 104, the upper surface of the two jaws forming the clamp assembly 104 being recessed at 114 (FIG. 7) to receive the lower end of the pin 113.

It is important that bending of the two strings 36 and 37 be avoided when a downward force is applied to the loading pin 113 by the loading bar 41. This is achieved by limiting the contact between the pin 113 and the finger 76 to a point contact, such point contact being in line with the strings 36 and 37. The upper surface 116 of the loading pin 113 is a spherical radius (FIG. 7), and the underside of the finger 76 rests on the surface 116. The lower surface of the finger 76 is flat and, since the upper surface of the pin 113 is a spherical radius, the contact between the finger 76 and the pin 113 may be considered essentially a point contact. When a weight is placed on the pan of the scale, the engaging surfaces between the finger 76 and the pin 113 may deform a very small amount, but these surfaces resume their original configurations when the weight is removed from the pan 20. Engagement between the finger 76 and the pin 113 also prevents lateral movement of the loading cylinder 38, and reduces or eliminates any cross coupling between the two strings 36 and 37.

With regard to the connections to the upper string 36, the lower end of the upper string 36 is also rigidly secured to the loading cylinder 38, such connection being made by another clamp assembly 121 which is preferably identical with the clamp assemblies 104 and 94. The relatively thin flanges of the two jaws of the clamp 121 are on the upper side of the assembly 121, and they define the lower end of the vibrating portion of the upper string 36. The clamp assembly 121 is secured to the loading cylinder 38 by two bolts 122 which extend through holes formed in the two jaws of the clamp assembly 121 and are threaded into upper ends of the two holes 109 formed in the loading cylinder 38.

The upper end of the upper string 36 is rigidly connected by another clamp assembly 126 to the armature 127 of the servo 39. The clamp assembly 126 is preferably identical with the other clamp assemblies 94, 104 and 121, and is secured to the underside of the armature 127 by a pair of screws 128. The relatively thin flanges of the two jaws of the clamp assembly 126 are on the lower side of the clamp assembly, and the relatively thin flanges define the upper end of the vibrating portion of the upper string 36. As shown in FIG. 7, a hole 129 is preferably formed in the center of the armature 127, into which the upper end of the string 36 may extend.

The clamp assemblies described above are highly advantageous because they firmly grip the strings 36 and 37 and they accurately define the effective or vibrating portions of the two strings, thus enabling attainment of two identical strings.

The armature 127 of the servo 39 is movable vertically in order to vary the pretension on the two strings 36 and 37. The servo 39 further includes a servo coil 131 (FIG. 7), a magnet cap 132 and a ring 133. The cap 132 includes a center pole 134 which has a smaller diameter than that of the armature 127, and an annular outer wall 136. The cap 132 and the ring 133 are received within a counterbore 137 at the upper end of the hole 82 formed in the post 81, the ring 133 resting on the upper surface of a ledge 138 formed by the counterbore 137 and the wall 136 of the cap 132 resting on the upper surface of the ring 133. The cap 132 and the ring 133 are retained in the counterbore 137 by a plurality of screws 139 (FIGS. 4 and 6) which are threaded into holes formed in the upper surface of the post 81 adjacent the counterbore 137. The heads of the screws 139 overlie the edges of the cap 132 and prevent the cap 132 from accidentally coming out of the counterbore 137. The cap 132, the armature 127 and the ring 133 are made of a magnetic material, preferably soft iron. When current flows through the coil 131, magnetic flux will follow a path that includes the pole 134 of the cap 132, an air gap 135 formed between the pole 134 and the armature 127, the armature 127, the ring 133, the outer wall 136 of the cap 132, and return to the center pole 134. The upper side of the armature 127 is normally separated from the center pole 134 and the ring 133 by the relatively narrow air gap 135, and the amount of upward attraction between the armature 127 and the cap 132 will be determined by the amount of current flowing through the coil 131.

The armature 127 of the servo 39 is also biased upwardly by a pair of vertically spaced springs 142 and 143, the springs serving to pretension the two strings 36 and 37. In addition to pretensioning the strings 36 and 37, the springs 142 and 143 also guide the movement of the armature 127 such that the armature moves only in the direction of the axis of the strings 36 and 37. The two springs 142 and 143 may, for example, be ordinary washers or Belleville springs. The inner edges of the two springs 142 and 143 engage downwardly facing shoulders 144 and 146, respectively, on the outer periphery of the armature 127. The outer edges of the two springs 142 and 143 are supported by a support ring 147 which is received within a second counterbore 148 formed below the upper counterbore 137. The lower edge of the ring 147 is supported by a ledge 149 formed by the counterbore 148, and the outer edges of the two springs 142 and 143 are received within upwardly facing shoulders 151 and 152, respectively, formed on the inner periphery of the ring 147.

During assembly of the scale, the strings 36 and 37 are secured to the base cylinder 86 to the loading cylinder 38, and to the armature 127, and this assembly is positioned in the hole 82 of the post 81. The armature 127 is positioned on the springs 142 and 143 which are then in unstressed states. A weight (not shown) of a predetermined magnitude is temporarily fastened to the lower end of the cylinder 86, with the cylinder loose in the clamp ring 87, and the weight pretensions the two strings 36 and 37 and flexes the two springs 142 and 143. The clamp ring 87 is tightened on the base cylinder 86 by tightening the screw 91 to hold the springs 142 and 143 and the strings 36 and 37 under tension. The temporary weight is then removed. Current flow through the servo coil 131 tends to pull the armature 127 upwardly toward the cap 132 and thereby place additional tension on the strings 36 and 37, the added tension produced by the servo of course being adjustable since the amount of current flowing through the coil 131 may be adjusted.

Figure 8:
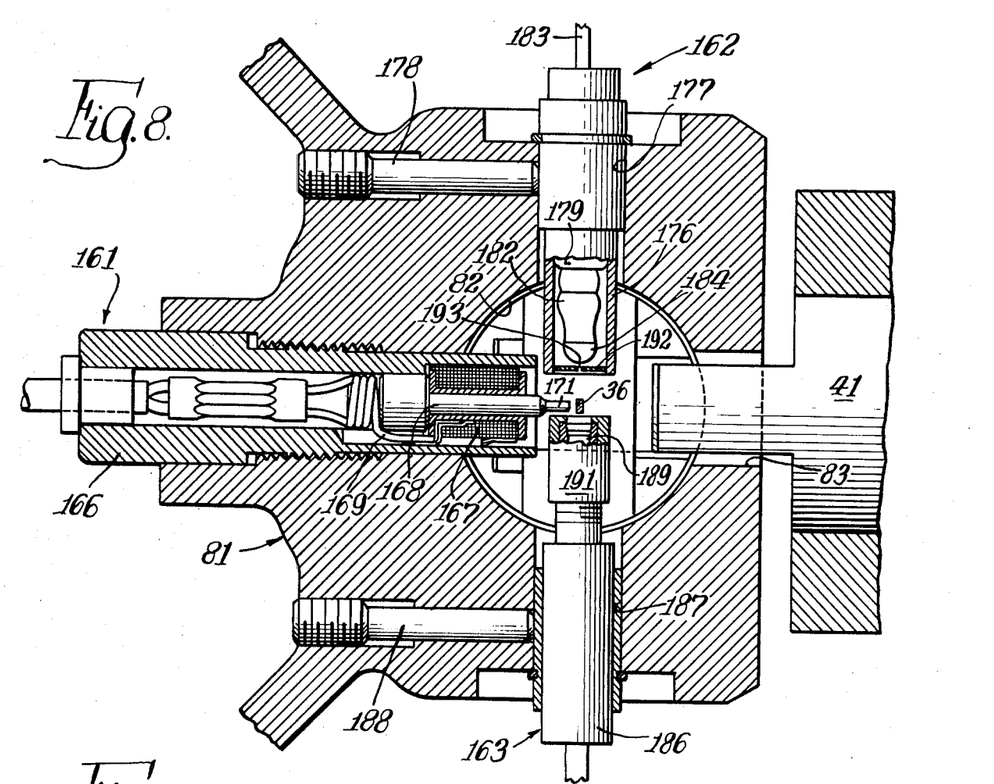
FIG. 8 is a fragmentary enlarged sectional view taken on the line 8—8 of FIG. 6.
Figure 9:
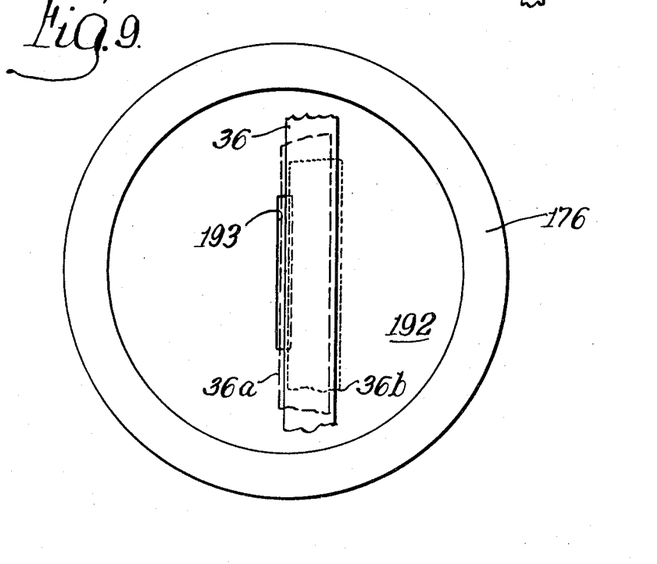
FIG. 9 is an enlarged fragmentary view taken on the line 9—9 of FIG. 7.

The apparatus for causing the two strings 36 and 37 to vibrate, and for providing an electrical signal having a frequency equal to the frequency of vibration of each string, is shown in detail in FIGS. 8 and 9. With reference to FIG. 8, adjacent each string, such as the string 36, is a driver 161, a light source 162, and a photo diode pick-up 163, the foregoing elements being located generally in the same plane transverse to each string and approximately midway between the ends of each string. The driver 161 comprises a bushing 166 which is threaded into a hole formed in the wall of the support post 81. The bushing 166 supports a coil 167 and a round core 168 made of a magnetic material, the core 168 extending through the coil 167 and beyond the inner end of the bushing 166 to a point which is closely adjacent the string 36. The coil 167 is connected by leads 169 to an external circuit to be described in more detail hereinafter. The embodiment illustrated, the string 36 and the string 37 are made of high carbon flat music wire, having a rectangular cross section, and the string 36 is oriented relative to the driver 161 such that the long dimension of the rectangle extends transversely of and is adjacent to the inner end 171 of the core 168. Current flowing through the coil 167 sets up a magnetic field in the core 168 and the string 36, and variations in the strength of the magnetic field will of course cause the string 36 to be attracted by varying amounts towards the inner end 171 of the core 168. For example, if a sinusoidally varying current flows through the coil 167, the strength of the attraction between the string 36 and the forward end 171 of the core 168 will also vary in a sinusoidal manner.

The light source 162 and the pick-up 163 provide a signal having a frequency representative of the frequency of vibration of the string 36. The light source 162 is displaced 90° from the driver 166 and includes a sleeve 176 which is positioned in a hole 177 extending through the wall of the post 81 and is secured thereto by a set screw 178. A lamp socket 179 and a lamp 182 are mounted within the sleeve 176, the lamp 182 being within the opening 82 and closely adjacent the string 36. Leads 183 extend through the sleeve 176 to the lamp 182 in order to energize the lamp. The front end 184 of the lamp 182 forms a lens which focuses the light from the lamp 182 toward the string 36.

A light restricting device is positioned between the light source and the pick-up. While the device could be located closely adjacent either the source or the pick-up, it is preferably adjacent the source. The forward end of the sleeve 176 extends inwardly beyond the front end 184 of the lamp 182, and an opaque filter 192 extends across the open end of the sleeve 176. A vertically extending slit 193 (FIG. 9) is formed in the filter 192 at approximately the center thereof, the slit serving to limit the amount of light leaving the sleeve 176.

On the opposite side of the string 36 from the light source 162 is provided the pick-up 163, which also includes a sleeve 186 secured within an opening 187 formed within the wall of the post 81 and secured in place by, for example, a set screw 188. The sleeve 187 supports a photo diode 189 and a tubular photo diode holder 191, the diode 189 being fastened within the holder 191. The inner end of the holder 191 is located closely adjacent the string 36, and light from the lamp 182 entering the open end of the holder 191 falls on the photo diode 189.

With reference to FIG. 9, as previously mentioned, the filter 192 is generally circular and it has the vertically extending slit 193 formed therein. While the thickness of the string 36 is greater than the width of the slit 193, the slit 193 is offset laterally from the string 36, and when the string 36 is stationary, it covers approximately one half of the width of the slit 193. Since the string 36 is a band as shown, the string 36 vibrates in only one plane, this plane being normal to the path of the light between the lamp 182 and the pick-up. As the string 136 vibrates, it always covers at least a portion of the slit 193 but the swing is not great enough for the string to cover the entire width of the slit 193. The dashed line position 36a and the dotted line position 36b in FIG. 9 show the approximate positions of the string 36 at the two peaks of its swing. With this arrangement, varying areas of the slit 193 are covered by the width of the string 36 and consequently varying amounts of light from the lamp 182 will leave the sleeve 176 and fall on the photo diode 189. The photo diode 189 is connected in the circuit shown in FIG. 12 which develops a signal having a sinusoidal variation, the frequency of the sine wave being exactly equal at any instant to the frequency of vibration of the string 36.

As previously mentioned, a driver, light source, and pick-up for the lower string 37 are also provided, these components for the string 37 being identical with the corresponding components illustrated in FIGS. 8 and 9 and described above.

For computation purposes, it is highly desirable that the frequency of an output signal taken from the weight sensing cell by a linear function of the amount of weight on the pan 20. As will be discussed hereinafter, this function is made nearly linear by adjusting the pretensions in the two identical strings 36 and 37, and the function may be made essentially linear by applying an upwardly or a downwardly directed spring force of a suitable gradient on the pan 20. In the construction illustrated in FIGS. 1 to 9, the flexure links 28 and 29 provide a portion of such spring force gradient, and the remaining spring force gradient is provided by a finely adjustable spring. It should be understood, however, that the entire spring force gradient may be built into the links 28 and 29 or the gradient may be divided between the links and a fixed spring such as a coil spring, positioned to produce an upwardly directed force on the loading bar 41.

With reference to FIGS. 4 and 6, in the present instance the adjustable spring is arranged to apply an upwardly directed force, and comprises a leaf spring 194 and a support block 194a secured to the base 26 by a plurality of screws 194b. The inner end of the leaf spring 194 is positioned under an arm 41a formed on the right hand end, as seen in FIG. 6, of the loading bar 41. A number of holes are provided in the block 194a and in the base 26 for the screws 194b, so that the position of the block 194a may be adjusted relative to the base 26 and to the leaf 194. It will be apparent that the upwardly directed spring force gradient exerted by the leaf 194 on the loading bar 41 will increase as the support 194a is moved closer to the arm 41a, and vice versa.

The foregoing arrangement is highly advantageous because it permits the use of two identical strings and it enables an adjustment for linearity. The exact amount of spring force gradient required to produce an essentially linear relation between weight and frequency may be obtained after the scale has been assembled, by properly positioning the support 194a.

Such an adjustment can be extremely important in the manufacture of scales because it permits a final, accurate adjustment before the scale leaves the manufacturer's factory, and it also permits readjustment of the scale at any time thereafter.

In addition to reducing linearity error, the use of a spring, with or without a servo for adjusting string tension, is also advantageous in the cell shown in FIGS. 1 to 9 for the following reasons: where the flexure links are made of a material whose stiffness changes with temperature, drift of zero weight reading may be minimized by supporting the dead weight of the pan and the pan support structure on a low gradient spring whose spring gradient changes little with temperature; the pan and the support structure therefor may be preloaded upwardly to about scale capacity with a low gradient spring, thereby approximately doubling the total range of the scale; a small low gradient spring having a thermal coefficient opposite to that of the drift of the zero weight reading may be used to compensate for temperature drift; and an adjustable force low gradient spring may be used as a tare compensator or tare adjustment.

Also associated with the arm 41a of the loading bar 41 is an up stop, a movement detector, and a movement dampener. The up stop comprises a screw 195 connected to an inverted U-shaped bracket 196. The web 196a of the bracket 196 overlies the arm 41a and the arms of the bracket 196 extend downwardly to the base 26 and are secured thereto as by screws 196b (FIG. 4). The position of the screw 195 may be adjusted so that its lower end is normally spaced a short distance above the arm 41a but close enough so that excessive upward movement of the bar 41 will cause the arm 41a to engage the screw 195, thereby preventing still further upward movement.

The movement detector and the movement dampener comprise another screw 197 connected to the web 196 of the bracket 196. The shank of the screw 197 is electrically insulated from the web 196a by a washer 197a made of an insulating material, and a conductor 198 is electrically connected to the shank of the screw 197. Fastened to the arm 41a of the loading bar 41, directly below the screw 197, is a metal tray 199, and the head 197b of the screw 197 extends into and closely adjacent the tray 199. The head 197b and the tray 199 form the two plates of a capacitor, electrical connections to the two plates being made by the conductor 198 and a ground connection to the base 26. The screw 197 and the tray 199 may be connected in a conventional electric circuit designed to detect changes in the amount of capacitance between them. Thus, the screw 197 and the tray 199 form part of a motion detecting circuit which indicates when the weighing pan 20 is stationary.

The head 197b of the screw and the tray 199 also form part of the movement dampener. A viscous liquid 199a is placed in the tray 199 and the head 197b extends into the liquid 199a, such liquid damping movement of the tray 199 and the loading bar 41.

In addition to the up stop formed by the screw 195, a down stop is also provided comprising another screw 200 connected to the base 200 directly below the loading bar brace 31. The head 200a of the screw 200 is closely adjacent the underside of the brace 31 and thus limits the downward movement of the brace 31, and a nut 200b tightened on the screw 200 holds the screw 200 in an adjusted position.

It is important that the amplitude of vibration, or the excursion of the strings be controlled in order to achieve a linear weight-frequency function. This may be accomplished by holding the excursion at a constant value, or by letting the excursion vary but holding it within limits. In the present construction, the excursion is controlled by controlling the driving force exerted by the drivers 61. With regard to the previously mentioned limits, the driving force should of course be great enough to sustain oscillation and to avoid noise problems, but it should not be so great as to make the excursion more than approximately 0.1 percent of the string length. For example, tests on a one inch string show that the resonant frequency of the string is essentially independent of the magnitude of the driving force if the excursion is less than approximately 0.001 inch.

Figure 12:
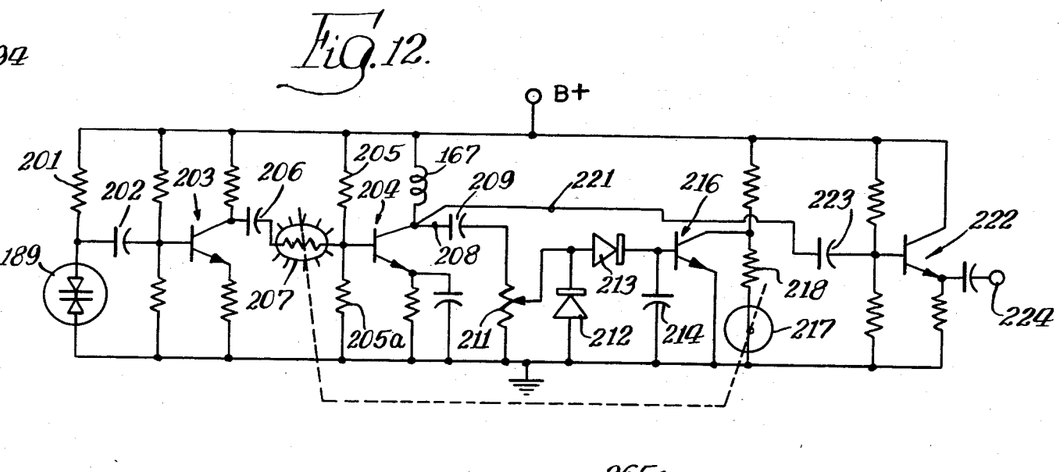
FIG. 12 is a schematic electrical diagram showing in detail one of the circuits in FIG. 10 and FIG. 11.

FIG. 12 illustrates a circuit which includes both the coil 167 of the driver 161 and the photo diode 189 of the pick-up 163, for driving a string with a substantially constant force. The photo diode 189 is connected in series with a resistor 201 and across a D.C. power supply indicated by B+ having a potential of, for example, 13 volts. A variation in the amount of light falling on the diode 189 due to movement of the string 36 causes a variation in the potential across the diode 189. Such potential variation causes current to flow through a capacitor 202 to the base of a transistor 203 which serves to amplify the signal. The collector of the transistor 203 is connected through a capacitor 206 and a photo resistor 207, to the base of another transistor 204, the function of the photo resistor 207 being described hereinafter. The collector of the transistor 204 is connected to the coil 167 of the driver 166, so that the potential on the base of the transistor 204 controls the amount of current flowing through the coil 167. Thus, the magnitude of the driving force exerted by the coil 167 may be set to maintain the string excursion within the previously mentioned limits as by adjusting the base potential of the transistor 204. This potential is determined by the relative values of two resistors 205 and 205a connected in a voltage divider arrangement to the base of the transistor 204, and by the resistance of the photo resistor 207. If desired, the resistors 205 and 205a may be made variable so that the driving force can be set to obtain an excursion of less than 0.1 percent of string length. Fluctuations in potential across the drive coil 167 appear on a conductor 208 and are passed through a capacitor 209 and a variable resistor 211, to diodes 212 and 213 and to a capacitor 214, the foregoing components serving to rectify the signal representative of the current flowing through the coil 167. The rectified signal is applied to the base of the transistor 216, the collector and emitter of which are connected across a lamp 217 and a resistor 218. It will be apparent that the amount of current flowing through the transistor 216 will control the amount of current flowing through the parallel branch consisting of the lamp 217 and the resistor 218, and, consequently, the bias on the transistor 216 controls the amount of light generated by the lamp 217. The lamp 217 and the photo resistor 207 are physically located such that the photo resistor 207 receives light from the lamp 217, and consequently variations in the amount of current flowing through the lamp 217 results in variations in the resistance of the photo resistor 207. The feedback loop tends to smooth out the drive voltage in the coil 167 and maintains the drive amplitude of the current through the coil 167 substantially constant in spite of variations in the frequency of vibration of the string and variations in the amount of gain in the loop. The variable resistor 211 is provided so that the loop feedback may be adjusted. The potential across the base-emitter of the transistor 216 and the potential across the diode 213 serve as a reference against which the direct current feedback is adjusted.

Another conductor 221 is also connected to the drive coil 167 and the drive frequency signal is connected to the base of another transistor 222 through a capacitor 223. The signal output is taken from the emitter of the transistor 222, at a terminal 224.

Considering the operation of the circuit shown in FIG. 12, a vibration of the string associated with the photo diode 189 causes a variation in the resistance of the photo diode 189, the frequency of this variation being equal to the frequency of vibration of the string. Variations in the resistance of the photo diode 189 cause the amount of current flowing through the drive coil 167 to vary at the same frequency. The feedback loop consisting of the lamp 217 and the photo resistor 207 smooths out the voltage variations and maintains the drive amplitude through the coil 167 substantially constant regardless of variations in the frequency of vibration. If the frequency of vibration of the string changes due to a weight being placed on the pan, the frequency of the varying current through the drive coil 167 also changes. Consequently, the frequency of the drive coil will follow the natural frequency of the vibrating string and will keep the string vibrating at its fundamental frequency. The electrical signal appearing at the terminal 224 of course also has a frequency which is equal to the frequency of vibration of the associated string.

Figure 10:
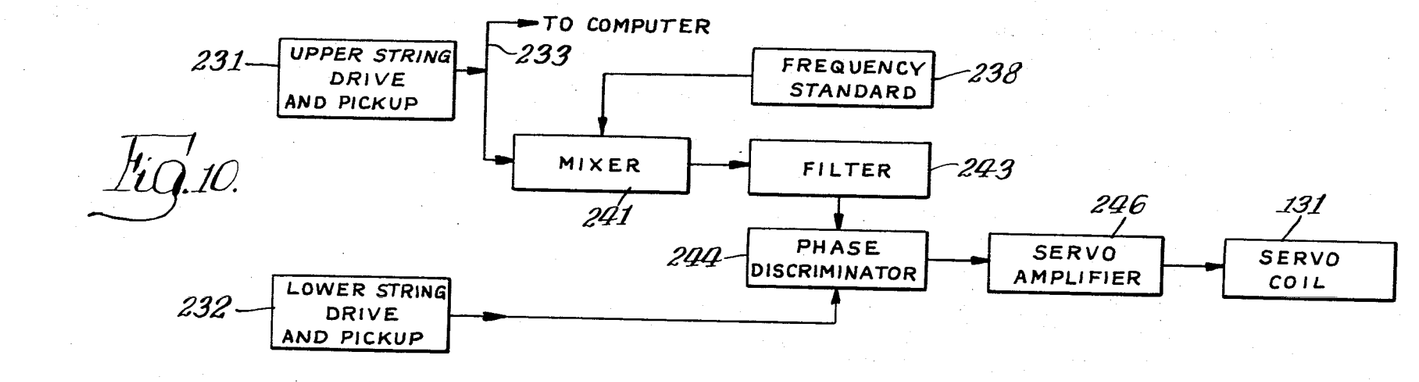
FIG. 10 is a block diagram showing an electric circuit that may be used for the cell.

FIG. 10 is a block diagram illustrating in greater detail the circuit shown in FIG. 3. The circuit comprises two drive and pick-up circuits 231 and 232, each of which is preferably identical with the circuit shown in FIG. 12, the circuit 231 being associated with the upper string 36 and the circuit 232 being associated with the lower string 37. The sine wave signal output from the circuit 231 is fed by a conductor 233 to a computer as previously described. As previously mentioned, for computing purposes, it is preferred that the frequency of the signal on the conductor 233 vary linearly with variations in weight, and, toward this end, the signals from the pick-ups 231 and 232 for the strings 36 and 37 are combined and an error signal is provided to actuate the servo 39 to adjust the tension on the strings 36 and 37. More specifically, the output signal of the upper string pick-up 231 is connected to a mixer circuit 241 where it is combined with a signal from a frequency standard 238. The difference frequency signal from the mixer 241 is passed through a filter circuit 243 to a phase discriminator circuit 244 which also receives the signal from the lower string pick-up 232. The discriminator circuit 244 may be any circuit which will produce a D.C. signal having an amplitude which varies with any change in the phase relation between its two input signals. The output signal of the phase discriminator circuit 244 is connected to a servo amplifier and integrator circuit 246, and the circuit 246 is connected so that its output signal drives the servo coil 131 of the servo 39. The discriminator 244 and the amplifier 246 provide a constant voltage output signal when the input signals to the discriminator 244 are equal in frequency and have a constant phase relationship. Generally, the servo 39 is powered to increase the pull on the strings as weight is increased.

Thus, the frequency of the standard 238 is mixed in the mixer 241 with the frequency of the upper string 36, and the difference frequency is compared in the discriminator 244 with the frequency of the lower string 37 to obtain an error signal. The error signal is connected to energize the servo coil 131 such as to hold the error signal at a fixed reference level. Where the two strings are identical and the frequency of the standard 238 is twice the frequency of one of the two strings, the reference level of the error signal is such as to cause no further adjustment to current flow through the servo coil 131.

Figure 11:
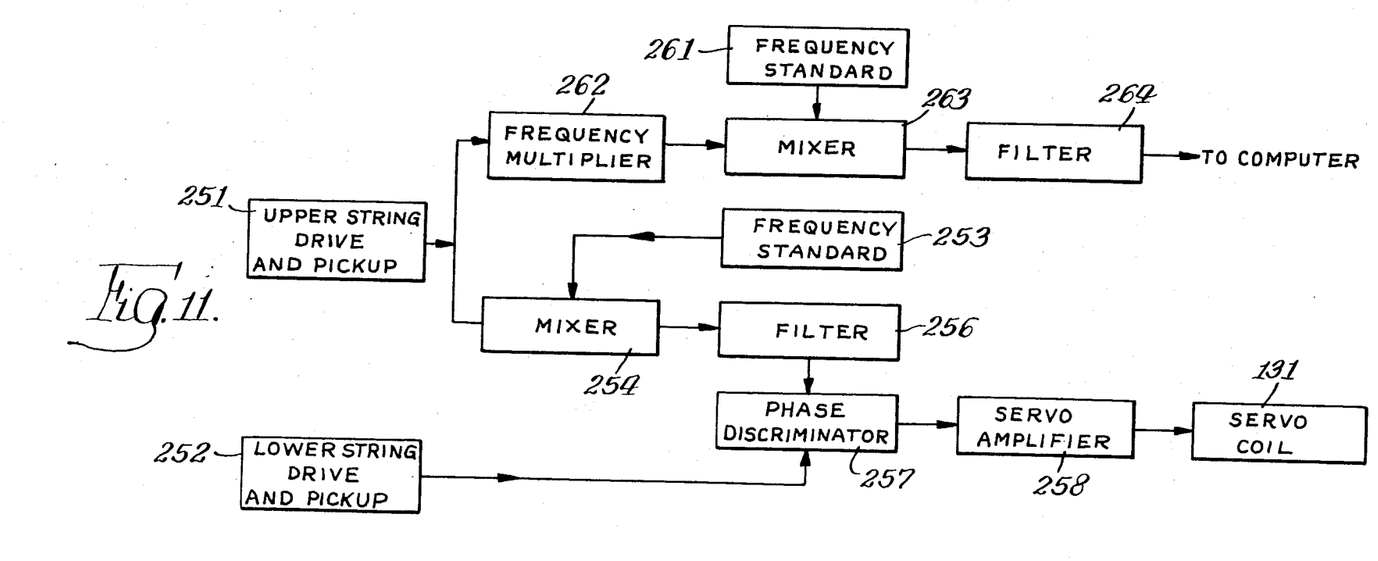
FIG. 11 is a block diagram showing an alternate form of electric circuit for the cell.

FIG. 11 illustrates an alternate circuit and comprises upper and lower drive and pick-up circuits 251 and 252 which may be identical with the corresponding circuits 231 and 232 shown in FIG. 10. The circuit shown in FIG. 11 also includes a frequency standard 253, a mixer 254, a filter 256, a phase discriminator 257, and a servo amplifier 258 which may be respectively similar to the circuits 238, 241, 243, 244 and 246 of FIG. 10.

In addition, the circuit shown in FIG. 11 includes a second frequency standard 261, a frequency multiplier 262 connected to receive the output signal of the upper string drive and pick-up circuit 251, a mixer 263 which is connected to receive the output signals of the standard 261 and the multiplier 262, and a filter 264 connected to the output of the mixer 263. The signal passed by the filter 264 is fed to a computer as previously described.

In a specific example of the operation of a cell including the circuit shown in FIG. 11, assume that the frequency of the upper string varies from 5,250 cps to 7,250 and that the frequency of the lower string varies from 5,250 cps to 3,250 cps as the amount of weight on the pan is changed from zero to the maximum rated amount. The frequency of the standard 261 is four times the zero weight frequency of the two strings, or 21,000 cps, and the multiplier 262 multiplies the frequency of the upper string by a factor of four. The filter 264 is constructed to pass the difference frequency of the two input signals to the mixer 263.

At the no-weight frequency of 5,250 cps, the frequencies of both the multiplier 262 and the standard 261 will be 21,000 cps, and consequently the difference frequency signal to the computer is zero. At the maximum rated weight frequency of the upper string of 7,250 cps, the frequency of the multiplier 262 is 29,000 cps and the difference frequency signal is 8,000 cps. Therefore, the frequency of the output signal to the computer varies between 0 and 8,000 cps for the circuit shown in FIG. 11, whereas the frequency of the output signal in the circuit shown in FIG. 10 would vary between 5,250 cps and 7,250 cps. The circuit shown in FIG. 11 is advantageous as compared with the FIG. 10 circuit in that the frequency spread or range is greater and is zero with no weight on the pan.

Figure 13:
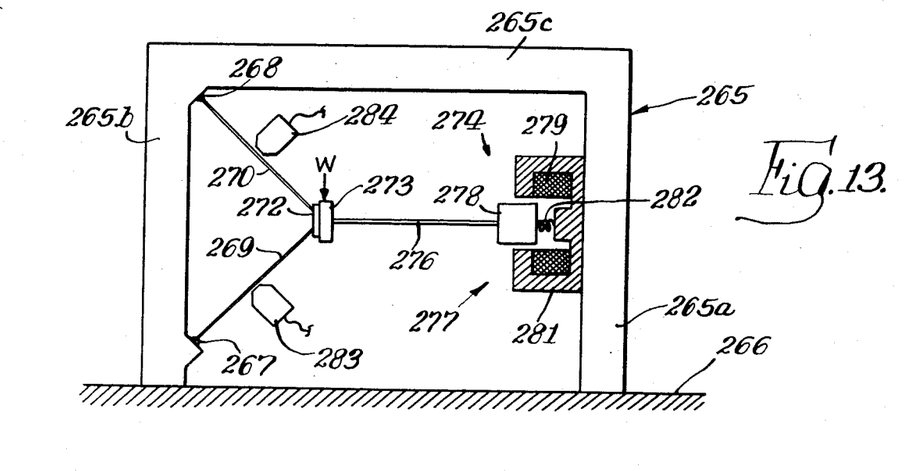
FIGS. 13 to 15 are schematic diagrams of alternate forms of weight sensing cells embodying the invention.

FIG. 13 illustrates schematically an alternate weight sensing cell embodying the invention. This cell comprises a rigid frame 265 which is supported by a platform 266. In the present instance, the frame 265 has an inverted U-shape and comprises two generally vertical uprights 265a and 265b and a generally horizontal top 265c. Fastened to the upright 265b by vertically spaced clamps 267 and 268 are the outer ends of a pair of strings 269 and 270, respectively. The inner ends of the two strings 269 and 270 are fastened by another clamp 272 to one side of a weight supporting member 273. The ends of the strings 269 and 270 are preferably secured by clamp assemblies of the character previously described. To the other side of the member 273 is fastened tensioning means 274 which, in the present instance, comprises a string 276 and a servo 277. The inner end of the cable 276 is fastened to the member 273 and the outer end of the string 276 is fastened to the armature 278 of the servo 277. The servo further includes a coil 279 fastened in a housing 281 which in turn is secured to the upright 265a. The tensioning means further includes a spring 282 connected to exert a pull on the armature 278. In the present instance the spring 282 is connected between the housing 281 and the armature 278.

The cell further includes pick-ups 283 and 284 positioned adjacent the strings 269 and 270, respectively. The pickeups 283 and 284 provide signals which are representative of the frequencies of vibration of the strings, and are connected in circuits of the character shown in FIGS. 10 to 12. The servo coil 279 is of course also connected in the above circuits and energized to adjust the string tension as previously described.

Thus, the spring 282 and the servo 277 pretension the two strings 269 and 270, and the frequencies of vibration of the strings are proportional to the amount of tension in the strings. A weight representative force is applied to the member 273, as by suspending a weight from the member 273 or by applying a point contact force on the member 273, and such a force increases the tension in the string 270 and decreases the tension in the string 269. The servo 277 operates to adjust the pretension in the two strings to produce a substantially linear function as previously explained. To compensate for any residual linearity error in the cell shown in FIG. 13, one of the two strings 269 and 270 may be constructed slightly differently from the other string. For example, one of the strings may be slightly longer, or have a slightly greater mass per unit length, or have a different cross section from the other string.

To summarize briefly the operation of each of the weight sensing cells disclosed herein, a weight to be measured, when received by the weight receiving member of the cell, causes the tension in one string to increase and the tension in the other string to decrease. Both strings are caused to vibrate at their natural frequencies, and these frequencies vary with tension in the strings. The frequency of one of the strings, or the difference between the frequencies of, the strings, is taken as an indication of the amount of weight and fed to a computer.

As mentioned, the difference between the frequencies of vibration of a pair of strings, and the frequency of each of the strings, are functions of the amount of tension in the strings, and such functions can be made substantially linear by adjusting the tensions in the strings using a servo as described. If equation (1) exactly defined the frequencies of the two strings, each of the above functions would be exactly linear. However, the functions are not exactly linear because the length and cross sectional area of a string changes slightly with tension, and because, for a metal string having fixed ends as disclosed herein, the shape of the deflection curve of vibration of each string changes as tension changes. By the deflection curve of vibration is meant the configuration of a string as it vibrates, such configuration being a sine wave in the case of a string having no flexural restoring forces. By a string having fixed ends is meant a string having ends which are rigidly held so that the slope and deflection of the string at its ends is zero.

A curve showing linearity error as a percent of full scale reading, plotted against the ratio of weight over initial tension, is a downwardly sloping curve, and it has been found that, when the tension is adjusted using the servo as described, this linearity error can be compensated for to produce an essentially linear weight-frequency function. Additional compensation produces an almost exactly linear function. Such additional compensation consists of introducing a compensating linearity error in the weight-frequency function, the curve of such compensating linearity error being substantially the mirror image of the first mentioned linearity error, so that the net or resultant linearity error is negligible. In a cell of the character shown in FIGS. 1 to 9, the displacement of the brace 31 and the bar 41 is a non-linear function of the amount of weight thereon when the tension is adjusted to maintain the previously described relation between the frequencies of the two strings. The compensating linearity error in such a cell construction is provided by the spring gradient of the flexure links 28 and 29 and by the spring gradient of the adjustable leaf spring 194. In a cell of the character shown in FIG. 13, the compensating linearity error is introduced as by making one string slightly longer than the other string or by making the mass per unit length of one string slightly greater than that of the other string, or by making the cross section of one string different from that of the other string.

The following is a summary of a mathematical analysis of a weight sensing cell of the character shown in FIGS. 1 to 9. The frequency $f\mu$ is the frequency of the string in which tension increases with weight, and the frequency $f_l$ is the frequency of the string in which the frequency decreases with weight:

The frequency $f\mu$ of the upper string 36 is $$f\mu = \frac{.569\sqrt{EI_o}}{l_o^2\sqrt{\rho_o}}\sqrt{40.14 + \frac{l_o^2}{EI_o}\left(T + \frac{W}{2}\right)}\left[1 - \frac{\delta_{c1}}{100} - \delta_{e1}\right] \quad (2)$$

and the frequency $fl$ of the lower string 37 is $$fl = \frac{.569\sqrt{EI_o}}{l_o^2\sqrt{\rho_o}}\sqrt{40.14 + \frac{l_o^2}{EI_o}\left(T - \frac{W}{2}\right)}\left[1 - \frac{\delta_{c2}}{100} - \delta_{e2}\right] \quad (3)$$

where

T is the tension applied to both strings in tandem, the tension being adjusted to maintain the previously described relation between the string frequencies,
$\rho_o$ is the mass per unit length of the strings when unstressed,
$\delta_{c1}$ is a fixed end factor for the upper string,
$\delta_{c2}$ is a fixed end factor for the lower string,
$\delta_{e1}$ is an elongation factor for the upper string,
$\delta_{e2}$ is an elongation factor for the lower string,
W is a weight to be measured,
E is the modulus of elasticity of the strings,
$l_o$ is the unstressed length of the strings, and
$I_o$ is the zero weight cross sectional moment of inertia of the strings.

$\delta_{c1}$ may be derived from $$\delta_{c1} = 15 - 6.761 \times 10^{\mu_1} \quad (4)$$

where $$\mu_1 = \left[.226\epsilon^{\frac{-l^2\left(T+\frac{W}{2}\right)}{1250EI}} + .1347\epsilon^{\frac{-l^2\left(T+\frac{W}{2}\right)}{269EI}}\right.$$
$$\left. - .00001832\frac{l^2}{EI}\left(T + \frac{W}{2}\right)\right] \quad (5)$$

$\delta_{c2}$ may be derived from $$\delta_{c2} = 15 - 6.761 \times 10^{\mu_2} \quad (6)$$

$$\mu_2 = \left[ .226\epsilon^{\frac{-\mu\left(T+\frac{W}{2}\right)}{1250EI}} + .1347\epsilon^{\frac{-\mu\left(T+\frac{W}{2}\right)}{269EI}} \right.$$

$$\left. -.00001832 \frac{l^2}{EI}\left(T-\frac{W}{2}\right) \right] \quad (7)$$

$$\delta_{c1} = e_o \left(\frac{T+\frac{W}{2}}{T_o}\right) \left[ 2.1 - \frac{\frac{1.6l_o^2}{EI_o}\left(T+\frac{W}{2}\right)}{40.14 + \frac{l_o^2}{EI_o}\left(T+\frac{W}{2}\right)} \right] \quad (8)$$

$$\delta_{c2} = e_o \left(\frac{T-\frac{W}{2}}{T_o}\right) \left[ 2.1 - \frac{\frac{1.6l_o^2}{EI_o}\left(T-\frac{W}{2}\right)}{40.14 + \frac{l_o^2}{EI_o}\left(T-\frac{W}{2}\right)} \right] \quad (9)$$

where $T_0$ is the tension in the strings at zero weight
$e_o$ is the elongation of the strings at $T=T_0$ and
$l$ is the length of the strings.

The expression to obtain the value of $T$ required to maintain the previously mentioned relationship between the two frequencies is $$T = T_o + \frac{b\left(\frac{W}{2}\right)^2}{\frac{40.14EI_o}{l_o^2} + T_o} \quad (10)$$

where $b$ is substantially constant but may vary according to the parameter ($l^2 T_o/EI_o$).

The difference between the two frequencies $f_\mu$ and $f_l$, as a function of $W$, may be determined from equations (2) AND (3). With the tension $T$ adjusted to maintain the previously described relation between the frequencies $f_\mu$ and $f_l$, the above difference frequency may be determined for a given cell construction wherein the two strings are identical. When linearity error as a percentage of reading is plotted against the ratio $W/T_o$ as $W$ is varied, a downwardly sloping curve will be produced, and this linearity error is present for each string frequency and also for the difference frequency.

When a spring having a gradient of $k$ lbs. per inch is applied to the pan of the scale, the net force applied to the strings is $$F = W - k \Delta x \quad (11)$$

where $\Delta x$ is the displacement of the brace 31 and the bar 41 as a result of a weight $W$ being applied and of the string tension adjustment required to maintain the previously described relation between the two string frequencies. The mathematical expression for the displacement $\Delta x$ is:

$$\Delta x = \frac{x_o e_o}{T_o} \left[ \frac{F}{2} - \frac{.258\left(\frac{F}{2}\right)^2}{40.14\frac{EI}{l^2} + T_o} \right] \quad (12)$$

substituting equation (12) into equation (11) and rearranging the terms, gives the equation $$F = \frac{1}{\left[1+\frac{kx_oe_o}{2T_o}\right]} \left[ W + \frac{.258kx_oe_oF^2}{4T_o^2\left(\frac{40.14EI}{l^2T_o}+1\right)} \right] \quad (13)$$

Since $$\frac{40.14EI}{l^2T_o}$$

is much less than 1 and $F$ is approximately equal to $W$, Equation (13) may be simplified to $$F \approx \frac{1}{\left[1+\frac{kx_oe_o}{2T_o}\right]} \left[ W + .0645kx_oE_o\frac{W^2}{T_o^2} \right] \quad (14)$$

where $x_o$ is the unstressed length of the lower string,
$x$ is the length of the string with any tension $T_2$,
$e_o$ is the elongation at tension $T_o$, and
$\Delta x$ is the change in length from the length at $T_o$ To determine the optimum value of $k$, the slope of the linearity error curve before correction, as previously discussed, is first determined and the slope $a$ is equated with the term 6.45 ($k\, l_o\, e_o/T_o$) and solved for $k$. In the construction shown in FIGS. 1 to 9, all of the spring gradient may be incorporated in the flexure links 28 and 29 or a portion of this spring gradient is incorporated in the flexure links 28 and 29 and a portion is incorporated in the leaf spring 194. The slope $a$ is generally approximately 0.0015 or less. The spring force gradient $k$ is approximately 135 lbs./in. for a scale having a capacity of 25 pounds or less.

A generally similar analysis may be made to determine the difference in length or mass of one string compared to the other string, in the cell shown in FIG. 13.

Figure 14:
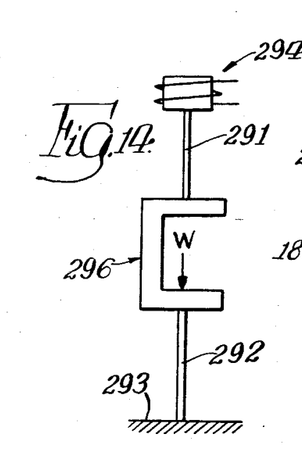
Figure 15:
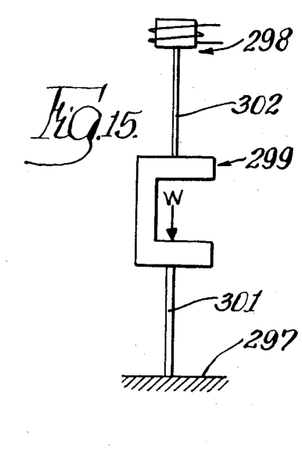

As previously mentioned, instead of utilizing the spring gradient of a spring to introduce a compensating linearity error, the compensating linearity error may be introduced in a cell including two differentially loaded strings, by making one string longer than the other, or by making the mass per unit length of one string different from that of the other, or by making the cross sectional configuration of one string different from that of the other. FIG. 14 illustrates a weight cell where one string is longer than the other and FIG. 15 illustrates a cell where the mass per unit length of the strings is different. In FIG. 14 two differentially loaded strings 291 and 292 are connected between a stationary support 293, a tension adjusting device 294, and a weight receiving member 295. The string 292 is longer than the string 291, the strings being otherwise identical, by an amount which compensates for any nonlinearity in the weight-frequency function of the cell.

In FIG. 15 is shown a cell including a support 297, a tension adjusting device 298, a weight receiving member 299, and two strings 301 and 302. The string 301 has a larger cross section than the string 302 and therefore has a greater mass per unit length, assuming that the strings are otherwise identical. The difference in cross sections is such as to compensate for any nonlinearity in the weight frequency function of the scale.

While a number of load cell constructions have been shown and described, it will be apparent that other arrangements incorporating the invention may be devised. For example, in an arrangement of the strings generally as shown in FIG. 3 but with the servo connected to the lower end of the lower string, any remaining linearity error may be compensated for by making the lower string sufficiently longer or of greater mass than the upper string to over compensate such remaining linearity error. A suitable spring gradient connected to the pan may then also be used to eliminate such overcompensation. An advantage of such a construction is that the range required of the servo may be less than in the arrangement shown in FIG. 3.

We claim:

1. A weight sensing cell for a scale, comprising a weight receiving member, a pair of differentially loaded vibrating members held under tension, one end of each of said members being connected to said weight receiving member, means for adjusting the tension in said vibrating members, means responsive to vibrations of said vibrating members for generating signals having frequencies which are respectively functions of the frequencies of vibration of said vibrating members, means for generating a fixed frequency, means for combining said fixed frequency with the frequency of one of said signals to produce a difference frequency signal, means for comparing the frequency of said difference signal with the frequency of the other of said signals to produce an error signal, said adjustable means being responsive to said error signal and adjusting the tension in said vibrating members to hold said error signal at a constant value.

2. A weight sensing cell as in claim 1, wherein said vibrating members are in aligned end-to-end relation.

3. A weight sensing cell as in claim 1, wherein said vibrating members make an angle of less than 180° with each other.

4. A weight sensing cell comprising first and second vibrating members, means for connecting one end of one of said members to one end of the other of said members, means for connecting the other ends of said members to a support, means for pretensioning said first and second members, means for applying a weight representative force to said first mentioned means in such a direction to increase the tension in one of said members and to decrease the tension in the other of said members, means for vibrating said members and for sensing the frequencies of vibration of said members, and means responsive to the frequencies of vibration of said members for adjusting the tensions in said members to maintain a predetermined frequency relation therebetween.

5. A cell as in claim 4, and further including guide means for maintaining the movement of said first mentioned means substantially in said direction, and said force applying means making substantially point contact with said first mentioned means and applying said force in said direction.

7. A weight sensing cell for a weighing scale comprising a member adapted to receive a weight to be measured, a pair of differentially loaded vibrating members held under tension, each of said pair of members having one end connected to said weight receiving member, means for vibrating said pair of members and for sensing the frequencies of vibration of said pair of members, and means responsive to said frequencies of vibration of said pair of members for adjusting said tension to maintain a substantially linear function between said weight and the difference between said frequencies.

8. A cell as in claim 7, wherein said function has a linearity error, and compensating means for introducing a compensating linearity function to thereby produce an essentially linear function.

9. A cell as in claim 8, wherein said compensating means comprises a spring gradient connected to one of said weight receiving and weight applying members.

10. A cell as in claim 9, wherein said spring gradient is adjustable.

11. A cell as in claim 8, wherein said compensating means comprises a characteristic of at least one of said vibrating members to effect different vibrations of said one vibrating member as compared with the other of said vibrating members.

12. A cell as in claim 9, wherein said spring gradient may be determined by the equation $$k = a\, T_o / 0.0645\, l_o e_o$$

where
$a$ = the slope of said linearity error,
$T_o$ = the tension in said vibrating members with no weight applied,
$l_o$ = the length of said members with no weight applied, and
$e_o$ = the elongation of said members with no weight applied.

13. A cell as in claim 12, wherein $A$ is within the range of approximately 0.0015 to 0.0003.

14. A cell as in claim 7, wherein said tension adjusting means increases said tensions in both of said members simultaneously or decreases said tensions in both of said members simultaneously.

15. Apparatus comprising a string, means for supporting one end of said string, and tension adjusting means for supporting the other end of said string, said adjusting means comprising a movable armature, spring means for guiding the movement of said armature along a path which is parallel to the axis of said string and for applying a force on said armature, said force being directed along said path and pretensioning said string, and adjustable means for applying an additional force on said armature and thereby further tensioning said string, said spring means comprising at least one Belleville spring.

16. A weight sensing cell for a scale comprising first and second vibrating members, one end of said first member being connected to one end of said second member, means anchoring the other end of said first member, adjustable servo means for supporting the other end of said second member and holding said members under tension, means responsive to the weight of an article to be measured and connected to apply a force on said connection between said first and second members for increasing the tension in one of said members and for decreasing the tension in the other of said members by amounts which are functions of the weight of the article, means responsive to vibrations of said first and second members for generating first and second signals having frequencies which are functions of the frequencies of said first and second members respectively, and circuit means responsive to said first and second signals and connected to actuate said servo means to adjust the tension in said first and second members to maintain a predetermined relation between the frequencies of vibration of said first and second members.

17. Apparatus as in claim 16, wherein said circuit means comprises means for generating a fixed frequency, means for combining said fixed frequency with the frequency of one of said first and second signals to produce a difference signal, means for combining the frequency of said difference signal with the frequency of the other of said first and second signals to produce an error signal, and means for applying said error signal to said servo means such as to adjust the tension in said first and second members to eliminate said error signal.

18. Apparatus as in claim 16, wherein one of said first and second signals serves as an output signal having a frequency which is representative of the weight of said article.

19. Apparatus as in claim 16, wherein said first and second members comprise elongated strings arranged in aligned end-to-end relation, said servo means applying said tension in the line of said strings, and said force on said connection being applied in said line.

20. A weight sensing cell for a weighing scale comprising a member adapted to receive a weight to be measured, a pair of differentially loaded vibrating members, adjustable means connected to said members for pretensioning said members, each of said pair of vibrating members having one end connected to said weight receiving member, drive means for vibrating said pair of members and for sensing the frequencies of vibration of said pair of members, means responsive to said frequencies of vibration of said vibrating members and connected to actuate said adjustable means to adjust said pretension to maintain a predetermined frequency relation between said frequencies of vibration of said vibrating members, said drive including means for controlling the amplitude of vibration of said members.

21. A cell as in claim 20, wherein said amplitude controlling means maintains the amplitude of vibration of said vibrating members at a substantially constant value.

22. A cell as in claim 20, wherein said amplitude controlling means maintains the amplitude of vibration of said vibrating members at below a predetermined maximum value.

23. A weight sensing cell for a weighing scale comprising a member adapted to receive a weight to be measured, a pair of differentially loaded vibrating members, adjustable means connected to and pretensioning said members, each of said vibrating members having one end connected to said weight receiving member, drive means for vibrating said pair of members, means responsive to the frequencies of vibration of said members and connected to actuate said adjustable means to pretension said vibrating members to maintain a predetermined frequency relation between the frequencies of vibration of said members, the frequency of vibration of at least one of said members being a substantially linear function of weight when said predetermined frequency relation is maintained, and means for introducing a compensating linearity error to compensate for any nonlinearity in said function.

24. Apparatus as in claim 23, wherein said means for introducing a compensating linearity error comprises the spring gradient of a spring connected to said weight receiving member.

25. Apparatus as in claim 23, wherein said means for introducing a compensating linearity error comprises having said one of said members with a greater length than the other of said members.

26. Apparatus as in claim 23, wherein said means for introducing a compensating linearity error comprises having one of said members with a greater mass per unit length than the other of said members.

27. A weight sensing cell for a weighing scale comprising a member adapted to receive a weight to be measured, a pair of differentially loaded vibrating members, adjustable means connected to and pretensioning said members, each of said vibrating members having one end connected to said weight receiving member, drive means for vibrating said pair of members, said drive means including means for controlling the amplitude of vibration of said members, means responsive to the frequencies of vibration of said members and connected to actuate said adjustable means to pretension said vibrating members to maintain a predetermined frequency relation between the frequencies of vibration of said members, the frequency of vibration of at least one of said members being a substantially linear function of weight when said predetermined frequency relation is maintained, and means for introducing a compensating linearity error to compensate for any nonlinearity in said function.

* * * * *